United States Patent
Schneider et al.

(10) Patent No.: US 6,444,075 B1
(45) Date of Patent: Sep. 3, 2002

(54) HOT MELT CALENDERED OR EXTRUDED WEAR LAYER FOR EMBOSSED SUBSTRATES AND METHOD OF MANUFACTURE

(75) Inventors: Donald E. Schneider, Lititz; William M. McQuate, Denver; Peter A. Christie, Lancaster, all of PA (US)

(73) Assignee: Armstrong World Industries, Inc., Lancaster, PA (US)

( * ) Notice: Subject to any disclaimer, the term of this patent is extended or adjusted under 35 U.S.C. 154(b) by 0 days.

(21) Appl. No.: 09/477,261

(22) Filed: Jan. 4, 2000

Related U.S. Application Data

(62) Division of application No. 09/200,813, filed on Nov. 27, 1998.

(51) Int. Cl.[7] .......................... B31B 31/08; B31B 31/20; B31B 31/30
(52) U.S. Cl. ............. 156/242; 156/244.11; 156/244.27; 156/309.6; 156/309.9; 156/322
(58) Field of Search ................................ 156/209, 219, 156/231, 244.23, 244.25, 244.27, 246, 309.6, 309.9, 321, 322, 244.11, 242

(56) References Cited

U.S. PATENT DOCUMENTS

| | | | |
|---|---|---|---|
| 3,660,200 A | * 5/1972 | Anderson et al. | 156/306 |
| 4,100,318 A | 7/1978 | McCann et al. | 428/159 |
| 4,210,693 A | 7/1980 | Regan et al. | 428/152 |
| 4,214,028 A | 7/1980 | Shortway et al. | 428/159 |
| 4,273,820 A | 6/1981 | Swietzer | 428/159 |
| 4,306,927 A | * 12/1981 | Funk et al. | 156/244.27 |
| 4,384,904 A | * 5/1983 | Kauffman et al. | 156/209 |
| 4,595,621 A | * 6/1986 | Valenti et al. | 428/159 |
| 4,614,556 A | 9/1986 | Fry et al. | 156/78 |
| 4,614,680 A | 9/1986 | Fry et al. | 428/158 |
| 5,112,671 A | 5/1992 | Diamond et al. | 428/156 |
| 5,405,675 A | 4/1995 | Sawka et al. | 428/195 |
| 5,507,902 A | * 4/1996 | Wyner et al. | 156/209 |
| 5,560,797 A | * 10/1996 | Burt et al. | 156/244.19 |
| 5,609,685 A | * 3/1997 | Fux | 118/60 |
| 5,747,133 A | 5/1998 | Vinod et al. | 428/46 |
| 5,800,904 A | 9/1998 | Hallman et al. | 428/156 |
| 6,146,711 A | * 11/2000 | Courtoy et al. | 427/493 |

FOREIGN PATENT DOCUMENTS

| | | | |
|---|---|---|---|
| CH | 480 933 A | 11/1969 | B29D/9/00 |
| GB | 1 247 616 A | 9/1971 | B32B/3/30 |

* cited by examiner

Primary Examiner—Steven D. Maki
Assistant Examiner—Todd J. Kilkenny
(74) Attorney, Agent, or Firm—Womble Carlyle Sandridge & Rice, PLLC

(57) ABSTRACT

The invention relates to a textured surface covering having a hot melt wear layer and methods of applying the hot melt wear layer to a textured or embossed surface without distortion of the visual image of the textured substrate. The wear layer substantially follows the contours of the substrate with minimum change in thickness of the wear layer over the textured surface and provides an aesthetically pleasing three dimensional appearance to the textured surface of the substrate. Melt applying the melt processable polymer resin to the textured substrate with a conformable pressure roll deter entrapment of bubbles between the wear layer and the textured substrate. Therefore, the wear layer exhibits significant clarity and visual depth, as well as improved maintenance (cleanability) properties. The resulting product has a visual image clarity reflecting any texture in the substrate including very light reflective (lenticular moray) embossings.

28 Claims, 2 Drawing Sheets

HOT MELT CALENDERED OR EXTRUDED WEAR LAYER FOR EMBOSSED SUBSTRATES AND METHOD OF MANUFACTURE

CROSS REFERENCE TO RELATED APPLICATION

The present application is a division of co-pending U.S. application Ser. No. 09/200,813, filed Nov. 27, 1998.

FIELD OF THE INVENTION

The present invention relates to decorative products that are suitable as surface coverings for floors, walls, etc., and, more particularly it is directed to an embossed or textured product having a wear layer with a substantially uniform thickness and the method of manufacturing the wear layer. The wear layer is applied to an embossed or textured substrate and uniquely follows the contours of the substrate to provide a unique three dimensional aesthetic appearance with enhanced clarity.

HISTORICAL BACKGROUND OF THE INVENTION

Decorative products useful as surface coverings for floors, walls, etc., are well known in the art and have achieved broad use in domestic and commercial environments. Unfortunately, the application of a protective surface layer on an embossed substrate has presented many difficult problems. The embossing tends to diminish or distort upon application of the wear layer. Such distortion or diminishing reduces the aesthetic appearance and the three dimensional effect desired. Further, air is entrapped between the wear layer and embossed or textured substrate when the wear layer is laminated to an embossed or textured substrate by conventional lamination processes.

Many prior art protective wear layer surfaces comprise relatively rigid thermoset polymers which are laminated to a flat substrate. The laminated wear layer and substrate is then embossed. For example, Sawka U.S. Pat. No. 5,405,675 discloses applying a substantially uniformly thick protective surface layer to a base layer or substrate and then embossing the base layer at a temperature between the softening temperature of the base layer and the decomposition temperature of the base layer, but less than the softening temperature of the wear layer.

Attention is also called to Fry U.S. Pat. No. 4,614,556. In this patent the wear layer has a relief pattern formed thereon and is laminated to a flat base layer. In another embodiment, the wear layer, which is substantially uniform in thickness, is embossed and then the base layer comprising a hot-melt composition is applied to the embossed wear layer.

Other commercially available floor structures are made by applying a liquid plastisol to a smooth or textured substrate. When the plastisol is fused, air bubbles are entrapped reducing clarity. Further, the liquid plastisol tends to flow into the depressions of the embossed substrate, reducing the texture of the exposed surface.

OBJECTS AND SUMMARY OF THE INVENTION

It is an object of this invention to provide a decorative surface covering for floors, walls, etc., which has a subtle textured appearance providing new visual and physical three dimensional properties with enhanced clarity.

Another object of this invention is to provide a textured product which visually retains all of the textured features of the substrate while providing protection by means of the wear layer.

Still another object of this invention is to provide a wear layer on an embossed or textured substrate which is substantially uniform in thickness with substantially no variation in wear layer thickness throughout its length and breadth.

Yet a further object of this invention is to provide a textured product which clearly reflects the texture of the substrate including fine lenticular embossing.

Still a further object of this invention is to provide a direct hot melt calendering process or an indirect hot melt calender process in which a melt processable polymer resin or hot melt calendered film is formed and applied to woven fabrics, burlap, fibers, caning and scrims that have textured properties without evidence of detrimental air entrapment while retaining a visual image of the textured material.

A further object of this invention is to provide a hot melt calendering process and wear layer which can be applied to a textured substrate without shade change which normally occurs with plastisol wetting out a fabric or paper substrate.

Still a further object of this invention is to provide a unique textured material and method of producing the same which can be readily manufactured with commercially available calendering equipment.

Another object of this invention is the application of a hot melt wear layer to the textured or embossed substrate without loss of sharpness and distinctiveness and the softening of the embossed substrate which can cause a deterioration of the embossed pattern.

Yet another object of this invention is to permit pre-embossing (chemically and/or mechanically) of a substrate prior to applying a wear layer, which allows for a range of additional decorating techniques.

In summary, this invention relates to a hot melt calendered or extruded wear layer which can be melt applied to an embossed or textured substrate without distorting the substrate and which wear layer conforms to the embossing or texture to give a three dimensional aesthetically pleasing product.

These and other objects of the invention will be apparent from the following description and claims.

DETAILED DESCRIPTION OF THE INVENTION

In general, this invention relates to the unique combination of visual and physical properties achieved by applying a hot melt calendered or extruded PVC or non-PVC wear layer to a textured substrate.

Typical applications of this technology are floor and wall covering products.

A variety of textured substrates have been used such as, but not limited to, woven fabrics, burlap, duck, linens, decorative papers, fibers, scrims, caning and various types of embossed vinyl or embossed foams. The embossed vinyl or foam can be created either chemically and/or mechanically. These textured substrates can also be decorated via gravure printing, screen printing, spray printing or other means to enhance the decorative image.

Figure 1:
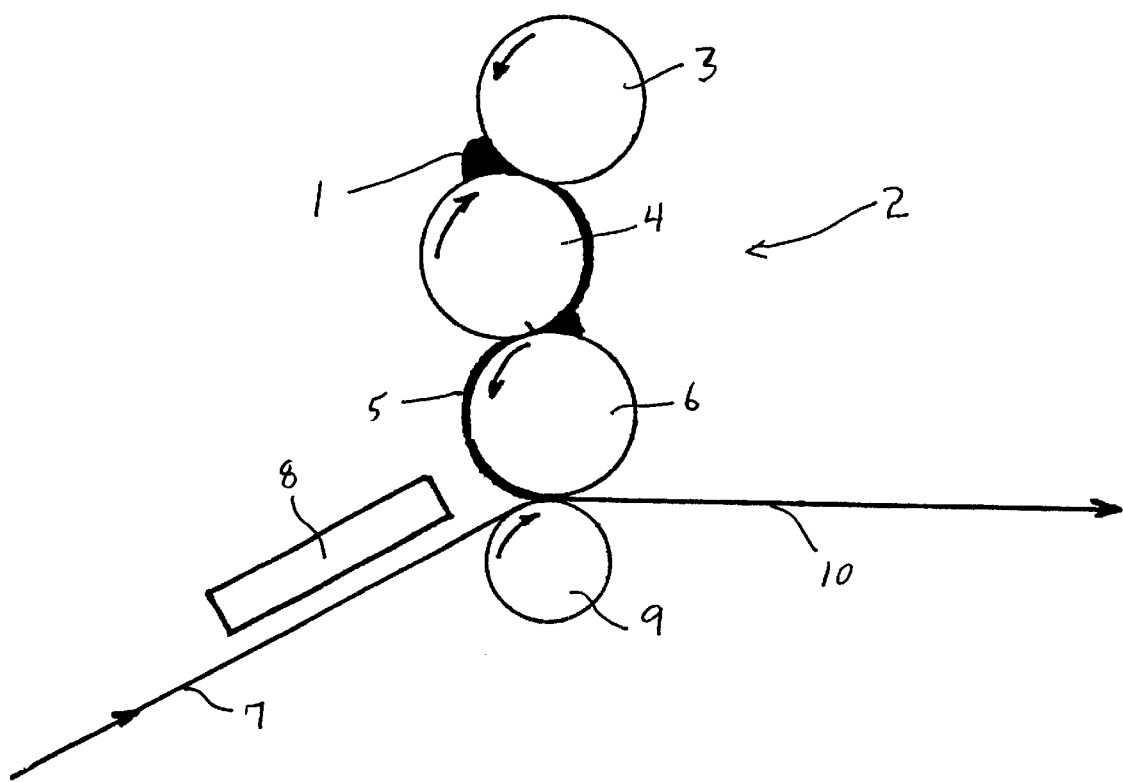
FIG. 1 is a schematic representation of one preferred embodiment of the equipment and process of the present invention.

The melt processable layer can be formed and applied via melt calender equipment in widths limited only by equipment and substrate availability. Referring to FIG. 1, a melt processable polymer resin composition 1 is delivered as a molten extrudate to a three roll calender 2 between first roll 3 and second roll 4. The melt processable polymer resin composition is further softened in the three roll calender by the heated rolls. The thickness of the molten layer 5 is determined by the gap between the second roll 4 and the third roll 6.

An embossed or textured substrate 7 is preheated by a heater 8. The molten layer 5 is applied to the preheated substrate 7 between the third roll 6 and the conformable pressure roll 9 forming textured multilayered composite 10 in which the melt processable polymer resin composition forms a substantially uniformly thick wear layer. The conformable pressure roll deters air entrapment between the melt processable polymer resin composition and the textured substrate. The exposed surface of the wear layer closely follows the embossing or texture of the substrate.

Figure 2:
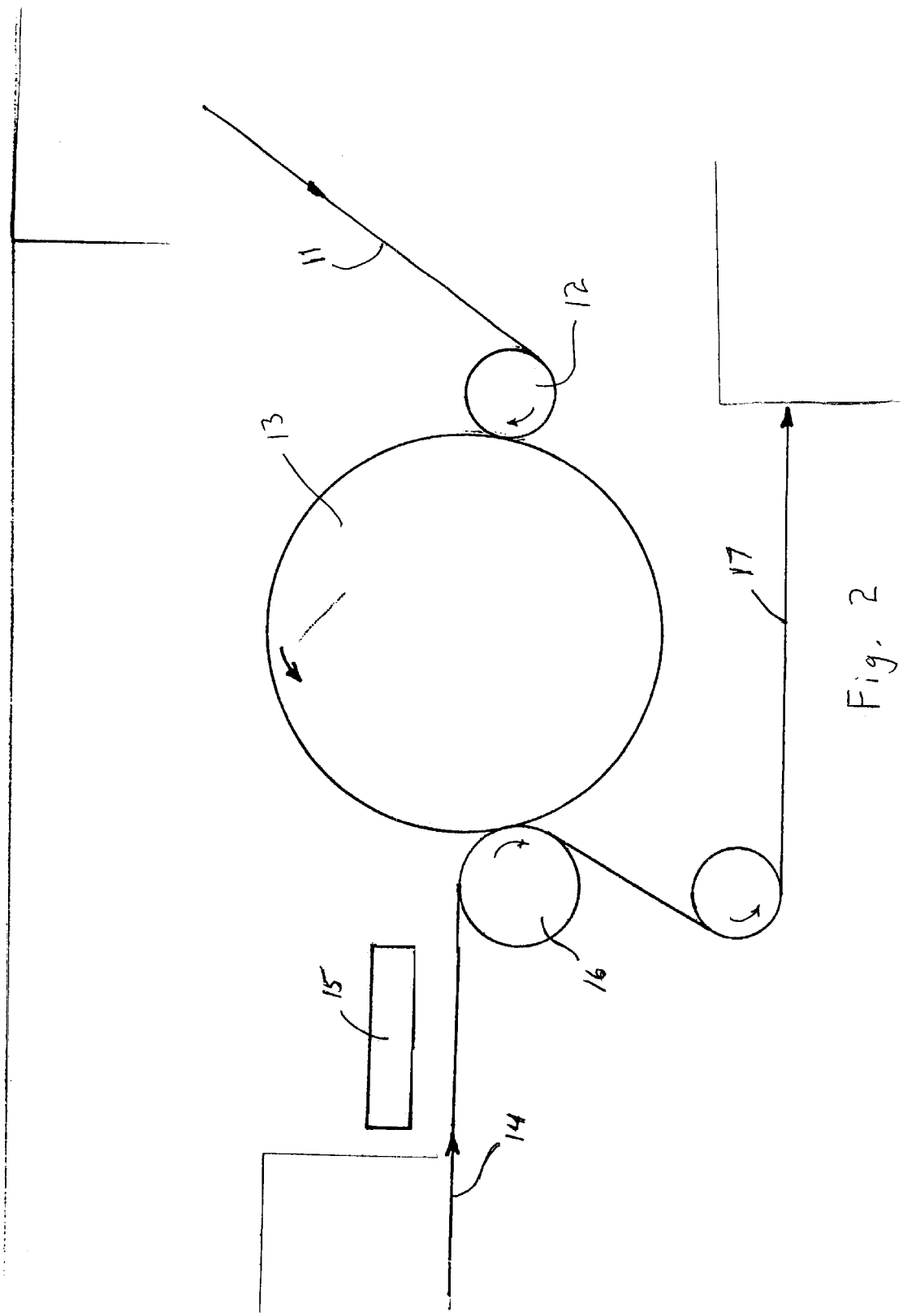
FIG. 2 is a schematic representation of a second preferred embodiment of the equipment and process of the present invention.

Referring to FIG. 2, an indirect process is shown in which the hot melt composition or melt processable polymer resin is introduced as a film 11. The film 11 is subsequently melted or softened and applied to the substrate with a calender, including a two roll calender, or heated drum and conformable pressure roll, such as a rubber roll.

In FIG. 2, the film 11 is introduced to a conformable rubber pressure roll 12 and onto a heated drum 13 in such a manner to eliminate entrapment of air between the film 11 and drum 13. The film is heated by the drum to melt the film or a softened condition approaching melt. The textured substrate 14 is preheated by heater 15. The film is then melt applied to the preheated substrate 14 between the heated drum 13 and a second rubber pressure roll 16 forming textured multilayered composite 17.

The melt calendered layer can have a wide range of thickness depending on cost and performance capabilities desired. Typical thickness may range from a few mils (0.005") to very thick layers (0.050" or greater). The thickness of the layer varies less than 25% with a preferred variation of less than 20%. The difference in height of the pre-textured surface of the present invention is at least about 1 mil vertical distance in not more than 20 mils horizontal distance, preferably at least about 2 mils vertical distance in not more than 20 mils horizontal distance, and the more preferably at least about 5 mils vertical distance in not more than 20 mils horizontal distance.

The average thickness of the overlying wear layer is between about 2 mils to about 50 mils. The preferred thickness is between about 5 mils to about 30 mils, and the most preferred is between about 10 mils to about 20 mils.

Melt calendering a melt processable layer directly to the textured substrate can be achieved without the air entrapment normally associated with lamination of a transparent layer onto an embossed or textured substrate by use of a conformable, preferably rubber, pressure roll.

Adhesive coatings may need to be applied to some substrates in order to provide adequate adhesion of the composite layers.

It has been determined that there are critical aspects to this invention relating to the viscosity of the hot melt calendered wear layer. The viscosity must be within a range of 4,500 to 70,000 poise. Above 70,000 poise the applied hot melt wear layer will not adhere adequately to the substrate and the temperature necessary for the viscosity to be below 4,500 poise will cause the hot melt film composition to degrade.

The viscosity is measured on an Instron Capillary Rheometer with a ram speed of 0.5 inches per minute and the 0.9960 inch long, 0.5033 inch diameter capillary or a shear rate of 73 per second.

For typical melt processable compositions, the specified viscosity range corresponds to a temperature range of 425° F. to 225° F. The preferred range is 10,000 to 50,000 poise (375° F. to 295° F.). In this range the melt composition bonds well to the substrate and it flows to conform well to the embossed substrate while substantially maintaining a uniform thickness. The most preferred range is 13,000 to 24,000 poise which corresponds to 325° F. to 360° F. The applied hot melt composition cools rapidly on the substrate avoiding distortion of the substrate resin though the melt temperature of the substrate may be similar to that of the hot melt composition which is applied.

The pre-textured substrate may comprise a layer of a woven fibrous layer, or a non-woven fibrous layer, or an embossed layer, or a layer comprising deposited matter and combinations thereof, such as a foamable ink or non-foamable ink. In any case, the temperature of distortion or melt of the pre-textured resin substrate need not be greater than that of the melt processable composition applied thereto. The viscosity of the melt processable composition is critical. The viscosity and the temperature associated therewith and rapid cooling permit the wear layer to conform to the textured substrate without it flowing around and into the valleys of the embossed substrate to give a substantially uniform wear coat thickness over the substrate without distortion of the textured surface.

A typical melt processable polymer resin having the following formulation was dryblended and compounded in an extruder, achieving a melt at 350° F. to 380° F.

| Ingredient | Weight Percent |
| --- | --- |
| General Purpose Vinyl Chloride Resin | 66.5 |
| Methylmethacrylate/Acrylic Copolymer Processing Aid | 1.3 |
| Acrylic Release Agent | 0.3 |
| Methylmethacrylate/Acrylic Copolymer Impact Modifier | 3.3 |
| Fatty Acid Ester Lubricant | 0.3 |
| Plasticizer | 26.0 |
| Stabilizer | 2.3 |

This melt was introduced into a three roll calender with the first calender roll at about 335° F., the second calender roll at about 345° F. and the third calender roll at about 355° F.

A molten layer, nominally 15 mils thick, was formed and applied directly to a textured substrate between the third calender roll and a rubber pressure roll. The textured substrate was preheated to about 275° F. A second textured multilayer composite was made using the same procedure but with a nominally 20 mil thick molten layer.

Alternatively, a commercially available, 20 mil thick flexible polyvinyl chloride film was substituted for the melt processable polymer resin composition formed above. The film was heated around a drum, to a temperature of about 345° F.

In both cases, the melt processable polymer resin wear layer had a substantially uniform thickness with a variation of less than 25% which followed the contours of the pre-textured substrate. The wear layer was in intimate contact with the pre-textured substrate; there were no visible bubbles entrapped between the wear layer and the adjacent surface of the pre-textured substrate, even when the difference in height of the pre-textured surface was at least about 5 mils vertical distance over no more than about 20 mils horizontal distance.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

What is claimed is:

1. A method of manufacturing a floor or wall covering having a wear layer bonded thereto comprising the steps of:
    a) heating a melt processable polymer resin composition to melt or soften the polymer resin composition;
    b) applying the melted or softened melt processable polymer resin composition to a pre-textured surface of a substrate, the pre-textured surface having an area with a difference in height of at least about 1 mil vertical distance over no more than about 20 mils horizontal distance; and
    c) cooling the melt processable polymer resin composition after it is applied to the pre-textured surface to form a textured surface covering for floor or walls comprising a wear layer bonded well on the pre-textured substrate, the wear layer having an average thickness of between about 2 mils to about 50 mils, the exposed surface of the wear layer closely follows the textured surface of the substrate,
        wherein the wear layer is of substantially uniform thickness.

2. The method of claim 1, wherein the melt processable polymer resin composition is applied to the pre-textured substrate between a heated roll. or drum and a conformable. pressure.

3. The method of claim 2, wherein the melt processable polymer resin composition is formed into an ambient temperature film prior to being heated on the roll or drum.

4. The method of claim 1, wherein the melt processable polymer resin composition is formed into a layer in a calendar prior to being applied to the pre-textured surface of the substrate.

5. The method of claim 1, wherein the melt processable polymer resin composition is heated in an extruder.

6. The method of claim 1, wherein the average thickness of the wear layer is greater than 10 mils.

7. The method of claim 1, wherein the average thickness of said wear layer is between about 5 mils to about 50 mils.

8. The method of claim 7, wherein the average thickness of said wear layer is between about 10 mils to about 20 mils.

9. The method of claim 8, wherein the difference in height is at least about 2 mil vertical distance over no more than about 20 mils horizontal distance.

10. The method of claim 9, wherein the difference in height is at least about 5 mil vertical distance over no more than about 20 mils horizontal distance.

11. The method of claim 1, wherein the pre-textured surface is heated prior to the application of the wear layer composition.

12. The method of claim 1, wherein the melt processable polymer resin composition is heated on the roll of a calender.

13. The method of claim 1, wherein the pre-textured surface comprises fibrous matter.

14. The method of claim 1, wherein the pre-textured surface comprises deposited matter.

15. The method of claim 14, wherein the deposited matter is incompressible during application of the melted or softened polymer resin composition.

16. A method of manufacturing a textured surface covering having a wear layer bonded thereto comprising the steps of:
    a) heating a melt processable polymer resin composition to melt or soften the polymer resin composition;
    b) applying the melted or softened melt processable polymer resin composition to a pre-textured surface of a substrate, the pre-textured surface. having an area with a difference in height of at least about 1 mil vertical distance over no more than about 20 mils horizontal distance; and
    c) cooling the melt processable polymer resin composition after it is applied to the pre-textured surface to form a textured surface covering for floor or walls comprising a wear layer bonded well on the pre-textured substrate, the wear layer having an average thickness of between about 2 mils to about 50 mils, wherein the melt processable polymer resin composition is applied to the pre-textured substrate between a heated roll or drum and a conformable pressure roll, and
        wherein the melt processable polymer resin composition is heated on the roll or drum, prior to being applied to the textured substrate. and
        wherein the exposed surface of the wear layer closely follows the textured surface of the substrate wherein the wear layer is of substantially uniform thickness.

17. The method of manufacturing a textured surface covering according to claim 16, wherein the melt processable polymer resin composition is formed into a layer in a calender prior to being applied to the pre-textured surface of the substrate.

18. The method of manufacturing a textured surface covering according to claim 16, wherein the melt processable polymer resin composition is heated in an extruder.

19. The method of manufacturing a textured surface covering according to claim 16, wherein the average thickness of the wear layer is greater 10 mils.

20. The method of manufacturing a textured surface covering according to claim 16, wherein the average thickness of said wear layer is between about 5 mils to about 50 mils.

21. The method of manufacturing a textured surface covering according to claim 20, wherein the average thickness of said wear layer is between about 10 mils to about 20 mils.

22. The method of manufacturing a textured surface coverage according to claim 16, wherein the pre-textured surface is heated prior to the application to the wear layer composition.

23. The method of manufacturing a textured surface covering according to claim 16, wherein the melt processable polymer resin composition is heated on the roll of a calender.

24. The method of manufacturing a textured surface covering according to claim 16, wherein the melt processable polymer resin composition is formed onto an ambient temperature film prior to being heated on the roll or drum.

25. The method of manufacturing a textured surface covering according to claim 16, wherein the pre-textured surface comprises fibrous matter.

26. The method of manufacturing a textured surface covering according to claim 16, wherein the pre-textured surface comprises deposited matter.

27. The method of manufacturing a textured surface covering according to claim 26, wherein the deposited matter is incompressible during application of the melted or softened polymer resin composition.

28. A method of manufacturing a textured surface covering having a wear layer bonded thereto comprising the steps of:

a) heating a melt processable polymer resin composition to melt or soften the polymer resin composition;

b) applying the melted or softened melt processable polymer resin composition to a pre-textured surface of a substrate, the pre-textured surface having an area with a difference in height of at least about 1 mil vertical distance over no more than about 20 mils horizontal distance; and c) cooling the melt processable polymer resin composition after it is applied to the pre-textured surface to form a textured surface covering for floor or walls comprising a wear layer bonded well on the pre-textured substrate, the wear layer having an average thickness of between about 2 mils to about 50 mils, wherein the melt processable polymer resin composition comprises a PVC resin and wherein the exposed surface of the wear layer closely follows the textured surface of the substrate, wherein the wear layer is of substantially uniform thickness.

* * * * *